(12) United States Patent
Zhao et al.

(10) Patent No.: US 11,463,435 B2
(45) Date of Patent: Oct. 4, 2022

(54) IDENTITY AUTHENTICATION METHOD AND SYSTEM BASED ON WEARABLE DEVICE

(71) Applicants: QUANTUMCTEK CO., LTD., Anhui (CN); SHANDONG INSTITUTE OF QUANTUM SCIENCE AND TECHNOLOGY CO., LTD., Shandong (CN)

(72) Inventors: Yong Zhao, Jinan (CN); Chunhua Liu, Jinan (CN)

(73) Assignees: QUANTUMCTEK CO.. LTD., Anhui (CN); SHANDONG INSTITUTE OF QUANTUM SCIENCE AND TECHNOLOGY CO., LTD., Shandong (CN)

( * ) Notice: Subject to any disclaimer, the term of this patent is extended or adjusted under 35 U.S.C. 154(b) by 108 days.

(21) Appl. No.: 16/978,606

(22) PCT Filed: Feb. 28, 2019

(86) PCT No.: PCT/CN2019/076399
§ 371 (c)(1),
(2) Date: Sep. 4, 2020

(87) PCT Pub. No.: WO2019/170025
PCT Pub. Date: Sep. 12, 2019

(65) Prior Publication Data
US 2021/0105270 A1 Apr. 8, 2021

(30) Foreign Application Priority Data
Mar. 9, 2018 (CN) .......................... 201810195543.1

(51) Int. Cl.
*H04L 9/40* (2022.01)
*H04L 9/08* (2006.01)

(52) U.S. Cl.
CPC ........ *H04L 63/0861* (2013.01); *H04L 9/0852* (2013.01); *H04L 63/0807* (2013.01); *H04L 63/0853* (2013.01); *H04L 63/0876* (2013.01)

(58) Field of Classification Search
CPC ............ H04L 63/0861; H04L 63/0807; H04L 63/0853; H04L 63/0876
See application file for complete search history.

(56) References Cited

U.S. PATENT DOCUMENTS

| | | | |
|---|---|---|---|
| 2013/0101121 A1* | 4/2013 | Nordholt | ................. H04L 9/083 380/279 |
| 2018/0019878 A1* | 1/2018 | Jiang | ..................... H04L 9/0894 |
| 2019/0095668 A1* | 3/2019 | Gaathon | .............. G07D 7/0047 |

FOREIGN PATENT DOCUMENTS

| | | |
|---|---|---|
| CN | 201310190418.9 | 5/2013 |
| CN | 201410295802.X | 6/2014 |

(Continued)

OTHER PUBLICATIONS

Zheng, Xiang, A New Method of Biological Quantum Key Distribution for Wireless Body Area Network, Master's Dissertation, Dec. 31, 2014, 67 pages.

(Continued)

*Primary Examiner* — Nelson S. Giddins
*Assistant Examiner* — Lydia L Noel
(74) *Attorney, Agent, or Firm* — Maschoff Brennan

(57) ABSTRACT

The method comprises: a user terminal initiating an authentication request to a target server and providing device information of the user terminal, and the target server receiving the authentication request and generating a temporary session, and sending a temporary session ID and the device information to a quantum key allocation network; the quantum key allocation network searching for a wearable device bound to the user terminal, and sending the temporary session ID to the wearable device; the wearable device (Continued)

collecting biological recognition information of a user, and sending the biological recognition information to the quantum key allocation network; and the quantum key allocation network matching the biological recognition information with pre-stored biological recognition information, wherein if matching is successful, an authentication result is sent to the target server, and then the target server sends the authentication result to the user terminal.

19 Claims, 3 Drawing Sheets

(56) References Cited

FOREIGN PATENT DOCUMENTS

| CN | 104182670 A | 12/2014 | | |
|----|----|----|----|----|
| CN | 201510598684.4 | 9/2015 | | |
| CN | 106953729 A | * | 7/2017 | ......... H04L 63/0428 |

OTHER PUBLICATIONS

Zhang et al., CAIXIA, Research on Safety Method of Wearable Medical Devices, Computer Science, Jun. 30, 2016, 5 pages, vol. 43, No. 6A.

International Search Report dated May 20, 2019 in related International Application No. PCT/CN2019/076399.

* cited by examiner

IDENTITY AUTHENTICATION METHOD AND SYSTEM BASED ON WEARABLE DEVICE

The present application is the U.S. national phase of International Application No. PCT/CN2019/076399, titled "IDENTITY AUTHENTICATION METHOD AND SYSTEM BASED ON WEARABLE DEVICE", filed on Feb. 28, 2019, which claims priority to Chinese Patent Application No. 201810195543.1, titled "IDENTITY AUTHENTICATION METHOD AND SYSTEM BASED ON WEARABLE DEVICE", filed on Mar. 9, 2018, with the China National Intellectual Property Administration, both of which are incorporated herein by reference in their entirety.

FIELD

The present disclosure relates to the field of information secure authentication, and in particular to an identity authentication method and system based on a wearable device.

BACKGROUND

With the rapid development of mobile Internet, internal business websites of enterprises and public institutions gradually develop towards mobile terminals. In order to provide convenience for staff to understand work content at any time, it is desired to be able to access a server of an internal website via a portable mobile terminal. A loophole in identity authentication may result in data leakage, causing an irreparable consequence for an enterprise. Therefore, a secure and reliable identity authentication method for mobile terminals is indispensable. Existing identity authentication methods for mobile terminals mainly include a method of performing login authentication by an account number and a password, a method of performing authentication by a dynamic password, and a method of performing authentication by comparing device identification information with device information of a user pre-stored in an authentication server. However, the account number, the password, the dynamic password, and a device ID may be intercepted or leaked.

Therefore, with the popularity of wearable devices, there are many related technologies in which wearable devices are introduced into identity authentication technologies, such as an authentication technology in which a common cryptographic technology is combined with wearable devices, and an authentication technology in which a biometric technology is combined with wearable devices. For example, in "Authentication Method for Wearable Device" (application No. 201510598684.4), lightweight operators such as a pseudo-random function, XOR operation, and a one-way authentication function are introduced into the authentication method, to achieve mutual authentication between a smartphone and a wearable device. In a process that the smartphone interacts with the wearable device, sensitive data such as a pseudo-identity identifier and a pre-shared secret value of the wearable device are transmitted in an anonymous manner so as to ensure security of interactive data. Further, a dynamic update mechanism is introduced, to improve freshness and randomness of a session cycle, and avoid attacks such as a replay attack and a personation attack by a malicious attacker. In "Authentication Method by Wearable Device and Wearable Device" (application No. 201310190418.9), identity authentication information of a user is acquired based on a biometric characteristic, and the identity authentication information is transmitted to a terminal via a wearable device for authentication. In addition, in "Authentication Payment Method and Payment Authentication System Based on Wearable Device" (application No. 201410295802.X), payment security is further improved by adding authentication for a wearable device.

The existing authentication method based on a wearable device is usually applied to identity authentication in a process that the wearable device interacts with a user terminal. Further, in a process of transmitting information in the existing authentication method based on a wearable device, an encryption manner based on complexity of a mathematical algorithm is usually adopted. A security mechanism based on a mathematical algorithm is easy to be cracked by the increasingly rapid developed computing technology. New algorithm loopholes are being constantly discovered, and are very fragile in the face of a future quantum computer, resulting in a severe security risk in the existing authentication method based on a wearable device. It is difficult for the existing authentication method based on a wearable device to adapt to identity authentication of high security requirements.

Therefore, how to improve security of identity authentication for a user terminal logging in a target server with the help of a wearable device is a technical problem to be urgently solved by those skilled in the art.

SUMMARY

In order to solve the above problem, an identity authentication method and system based on a wearable device are provided according to the present disclosure, for identity authentication of account management and access, so that a reliable authentication link from a user to a user terminal and then to a target server is constructed, and an authentication mechanism of high security is provided.

An identity authentication method based on a wearable device is provided according to a first aspect of embodiments of the present disclosure. The identity authentication method includes the following steps S1 to S4.

In step S1, a user terminal initiates an authentication request and provides device information of the user terminal to a target server, and the target server receives the authentication request to generate a temporary session, and transmits a temporary session ID and the device information to a quantum key distribution network.

In step S2, the quantum key distribution network receives the temporary session ID and the device information, searches for a wearable device bound to the user terminal, and transmits the temporary session ID to the wearable device.

In step S3, the wearable device receives the temporary session ID, collects biometric information of a user, and transmits the biometric information to the quantum key distribution network.

In step S4, the quantum key distribution network receives the biometric information, and matches the biometric information with pre-stored biometric information. Identity authentication corresponding to the temporary session ID succeeds in a case that the matching succeeds. The quantum key distribution network transmits an authentication result to the target server. The target server transmits the authentication result to the user terminal.

Optionally, the device information is a device ID of the user terminal or a quantum identity number. The quantum identity number is a unique identifier in an entire network distributed by the quantum key distribution network to the wearable device registered in the network. After the wearable device is bound to the user terminal, the quantum identity number is shared by the wearable device with the user terminal bound to the wearable device.

Optionally, in a case that the device information is the device ID of the user terminal, searching for the wearable device bound to the user terminal in step S2 includes:

first, searching for a quantum identity number corresponding to the device ID of the user terminal in the quantum key distribution network based on the device ID of the user terminal; and then, searching for a wearable device having the quantum identity number, that is, a wearable device bound to the user terminal, where identity authentication fails in a case that no wearable device having the quantum identity number is found, and device information pre-stored in the quantum key distribution network includes at least a quantum identity number of a wearable device registered in the quantum key distribution network in advance and a device ID of a user terminal bound to the wearable device.

Further, in a case that the device information is the quantum identity number, searching for the wearable device bound to the user terminal in step S2 includes:

searching for, based on the quantum identity number from the user terminal, a wearable device having the quantum identity number, that is, a target wearable device, from device information pre-stored in the quantum key distribution network, where identity authentication fails in a case that no wearable device having the quantum identity number is found, and the device information pre-stored in the quantum key distribution network includes at least a quantum identity number of a wearable device registered in the quantum key distribution network.

Optionally, in step S4, after the matching with the pre-stored biometric information succeeds, the identity authentication method further includes:

searching for device information bound to the biometric information stored in the quantum key distribution network, and determining whether found device information is identical to the device information received from the target server; and/or determining whether a temporary session ID received from the wearable device is identical to the temporary session ID received from the target server, where the temporary session ID received from the wearable device is transmitted at the same time when the wearable device transmits the biometric information to the quantum key distribution network; and determining that the identity authentication succeeds, in a case that the found device information is identical to the device information received from the target server and/or the temporary session ID received from the wearable device is identical to the temporary session ID received from the target server, where information pre-stored in the quantum key distribution network includes at least device information registered in the quantum key distribution network in advance and biometric information bound to the device information.

Optionally, the biometric information of the user includes one or more of: fingerprint information, heartbeat information, blood pressure information, retina information, iris information, voiceprint information, vein information, facial information, handwriting signature information.

Optionally, the quantum key distribution network and the target server both pre-store a first shared key for encrypting and decrypting communication data between the quantum key distribution network and the target server.

Optionally, the wearable device and the quantum key distribution network both pre-store a second shared key for encrypting and decrypting communication data between the wearable device and the quantum key distribution network.

Optionally, the wearable device is connected to the user terminal in a wireless manner or a wired manner.

An identity authentication system based on a wearable device is further provided according to a second aspect of the embodiments of the present disclosure. The identity authentication system includes a user terminal, a target server, a quantum key distribution network and a wearable device.

The user terminal is configured to initiate an authentication request and provide device information of the user terminal to a target server, and receive an authentication result transmitted by the target server.

The target server is configured to receive the authentication request to generate a temporary session, transmit a temporary session ID and the device information to the quantum key distribution network, receive the authentication result transmitted by the quantum key distribution network, and transmit the authentication result to the user terminal.

The quantum key distribution network is configured to receive the temporary session ID and the device information, search for a wearable device bound to the user terminal, transmit the temporary session ID to the wearable device, receive biometric information transmitted by the wearable device, and match the biometric information with pre-stored biometric information. Identity authentication corresponding to the temporary session ID succeeds in a case that the matching succeeds, and the quantum key distribution network transmits the authentication result to the target server.

The wearable device is configured to receive the temporary session ID, collect biometric information of a user, and transmit the biometric information to the quantum key distribution network.

Optionally, the device information is a device ID of the user terminal or a quantum identity number. The quantum identity number is a unique identifier in an entire network distributed by the quantum key distribution network to the wearable device registered in the network. After the wearable device is bound to the user terminal, the quantum identity number is shared by the wearable device with the user terminal bound to the wearable device.

Optionally, in a case that the device information is the device ID of the user terminal, searching for the wearable device bound to the user terminal includes:

first, searching for a quantum identity number corresponding to the device ID of the user terminal in the quantum key distribution network based on the device ID of the user terminal; and then, searching for a wearable device having the quantum identity number, that is, a wearable device bound to the user terminal, where identity authentication fails in a case that no wearable device having the quantum identity number is found, and device information pre-stored in the quantum key distribution network includes at least a quantum identity number of a wearable device registered in the quantum key distribution network in advance and a device ID of a user terminal bound to the wearable device.

Optionally, in a case that the device information is the quantum identity number, searching for the wearable device bound to the user terminal includes:

searching for a wearable device having the quantum identity number, that is, a target wearable device, from device information pre-stored in the quantum key distribution network, where identity authentication fails in a case that no wearable device having the quantum identity number is found, and the device information pre-stored in the quantum key distribution network includes at least a quantum identity number of a wearable device registered in the quantum key distribution network.

Optionally, after the matching with the pre-stored biometric information succeeds, the quantum key distribution network is further configured to:

search for device information bound to the biometric information stored in the quantum key distribution network, and determine whether found device information is identical to the device information received from the target server; and/or determine whether a temporary session ID received from the wearable device is identical to the temporary session ID received from the target server, where the temporary session ID received from the wearable device is transmitted at the same time when the wearable device transmits the biometric information to the quantum key distribution network; and determine that the identity authentication succeeds, in a case that the found device information is identical to the device information received from the target server and/or the temporary session ID received from the wearable device is identical to the temporary session ID received from the target server, where information pre-stored in the quantum key distribution network includes at least device information registered in the quantum key distribution network in advance and biometric information bound to the device information.

Optionally, the biometric information of the user includes one or more of: fingerprint information, heartbeat information, blood pressure information, retina information, iris information, voiceprint information, vein information, facial information, handwriting signature information.

Optionally, the quantum key distribution network and the target server both pre-store a first shared key for encrypting and decrypting communication data between the quantum key distribution network and the target server.

Optionally, the wearable device and the quantum key distribution network both pre-store a second shared key for encrypting and decrypting communication data between the wearable device and the quantum key distribution network.

Optionally, the wearable device is connected to the user terminal in a wireless manner or a wired manner.

A quantum key distribution network for identity authentication is further provided according to a third aspect of the embodiments of the present disclosure. The quantum key distribution network is configured to:

receive device information of a user terminal;

search for a wearable device bound to the user terminal; and receive biometric information collected and transmitted by the wearable device, and match the biometric information with pre-stored biometric information, where identity authentication succeeds in a case that the matching succeeds.

Optionally, the device information is provided by the user terminal when initiating an authentication request to a target server.

Optionally, the quantum key distribution network is further configured to receive a temporary session ID generated by the target server on receipt of the authentication request.

Optionally, the device information is a device ID of the user terminal or a quantum identity number. The quantum identity number is a unique identifier in an entire network distributed by the quantum key distribution network to the wearable device registered in the network. After the wearable device is bound to the user terminal, the quantum identity number is shared by the wearable device with the user terminal bound to the wearable device.

Optionally, in a case that the device information is the device ID of the user terminal, searching for the wearable device bound to the user terminal includes:

first, searching for a quantum identity number corresponding to the device ID of the user terminal in the quantum key distribution network based on the device ID of the user terminal; and then, searching for a wearable device having the quantum identity number, that is, a wearable device bound to the user terminal, where identity authentication fails in a case that no wearable device having the quantum identity number is found, and device information pre-stored in the quantum key distribution network includes at least a quantum identity number of a wearable device registered in the quantum key distribution network in advance and a device ID of a user terminal bound to the wearable device.

Optionally, in a case that the device information is the quantum identity number, searching for the wearable device bound to the user terminal includes:

searching for, based on the quantum identity number from the user terminal, a wearable device having the quantum identity number, that is, a wearable device bound to the user terminal, from device information pre-stored in the quantum key distribution network, where identity authentication fails in a case that no wearable device having the quantum identity number is found, and the device information pre-stored in the quantum key distribution network includes at least a quantum identity number of a wearable device registered in the quantum key distribution network.

Optionally, after the matching with the pre-stored biometric information succeeds, the quantum key distribution network is further configured to:

search for device information bound to the biometric information stored in the quantum key distribution network, and determine whether found device information is identical to the device information received from the target server; and/or determine whether a temporary session ID received from the wearable device is identical to the temporary session ID received from the target server, where the temporary session ID received from the wearable device is transmitted at the same time when the wearable device transmits the biometric information to the quantum key distribution network; and determine that the identity authentication succeeds, in a case that the found device information is identical to the device information received from the target server and/or the temporary session ID received from the wearable device is identical to the temporary session ID received from the target server, where information pre-stored in the quantum key distribution network includes at least device information registered in the quantum key distribution network in advance and biometric information bound to the device information.

Optionally, the quantum key distribution network and the target server both pre-store a first shared key for encrypting and decrypting communication data between the quantum key distribution network and the target server.

Optionally, the wearable device and the quantum key distribution network both pre-store a second shared key for encrypting and decrypting communication data between the wearable device and the quantum key distribution network.

A wearable device for identity authentication is further provided according to a fourth aspect of the embodiments of the present disclosure. The wearable device is bound to a user terminal and is configured to:

collect biometric information of a user; and transmit the biometric information to a quantum key distribution network for authentication.

Optionally, the wearable device collects the biometric information of the user after receiving a temporary session ID/device information. The temporary session ID is generated by a target server on receipt of an authentication request initiated by the user terminal and is transmitted by the target server to the quantum key distribution network. The device information is provided by the user terminal when initiating the authentication request to the target server, and is transmitted to the quantum key distribution network by the target server after receiving the authentication request.

Optionally, the wearable device is registered in the quantum key distribution network, stores a unique quantum identity number in the entire network, and is capable of storing keys, encrypting and decrypting data, and transmitting and receiving data.

Optionally, the wearable device and the quantum key distribution network both pre-store a second shared key for encrypting and decrypting communication data between the wearable device and the quantum key distribution network.

A target server is further provided according to a fifth aspect of the embodiments of the present disclosure. The target server is configured to:

receive an authentication request and device information of a user terminal transmitted by the user terminal, and transmit the device information to a quantum key distribution network; and transmit an authentication result from the quantum key distribution network to the user terminal.

Optionally, the target server is further configured to transmit a generated temporary session ID to the quantum key distribution network after receiving the authentication request transmitted by the user terminal.

Optionally, the target server is capable of both identity authentication and providing service access to the user terminal. Alternatively, the target server is capable of identity authentication only, and in a case that identity authentication for the target server is successful, other servers provide service access to the user terminal.

Optionally, the quantum key distribution network and the target server both pre-store a first shared key for encrypting and decrypting communication data between the quantum key distribution network and the target server.

Beneficial effects of the present disclosure are as follows.

An identity authentication method based on a wearable device is provided according to the embodiment of the present disclosure. The method is based on a quantum key distribution network, which provides an authentication service interface to a third-party target server, so as to replace the conventional authentication method based on a mathematical algorithm. Encryption is performed by using a quantum key, such that security for identity authentication is improved.

In the present disclosure, a wearable device is introduced in the identity authentication. Compared with the user terminal, the wearable device is more closely bound to an identity of a specific user, and has higher security. In addition, the wearable device is easy to use, and can effectively improve user experience.

In the present disclosure, a crucial authentication link is protected by using quantum cryptography, thereby having strong resistance against supposititious identification and deciphering.

In the present disclosure, biometric authentication is organically combined with the quantum key, so that reliability of identity authentication between devices as well as identity authentication between a human and a device are significantly improved, and security risks caused by the device are solved, thereby paving the way of "last kilometer" from a remote business server to a user.

BRIEF DESCRIPTION OF THE DRAWINGS

The accompanying drawings forming a part of the present disclosure are used to provide a further understanding of the present disclosure. Exemplary embodiments of the present disclosure and their descriptions are used to explain the present disclosure rather than constitute an undue limitation on the present disclosure.

DETAILED DESCRIPTION OF EMBODIMENTS

It should be noted that the following detailed description is illustrative and is intended to provide a further explanation of the present disclosure. Unless otherwise specified, all technical and scientific terms used herein have the same meaning as commonly understood by those skilled in the technical field to which the present disclosure relates.

It should be noted that the terminology used herein is only for describing specific embodiments, and is not intended to limit exemplary embodiments of the present disclosure. As used herein, unless context clearly indicates otherwise, a singular form is also intended to include a plural form. In addition, it should further be understood terms "comprising" and/or "including" used in this specification indicates that there is a features, a step, an operation, a device, a components, and/or a combination thereof.

The mobile terminal according to the embodiments of the present disclosure may include but is not limited to a mobile phone and a tablet. Any electronic device capable of network connection is applicable to the mobile terminal according to the embodiments of the present disclosure. The wearable device according to the embodiments of the present disclosure may include but is not limited to a smart ring, a smart bracelet, a smart watch, a smart necklace, and other small devices that contact with a human body and are carried around.

First Embodiment

Figure 1:
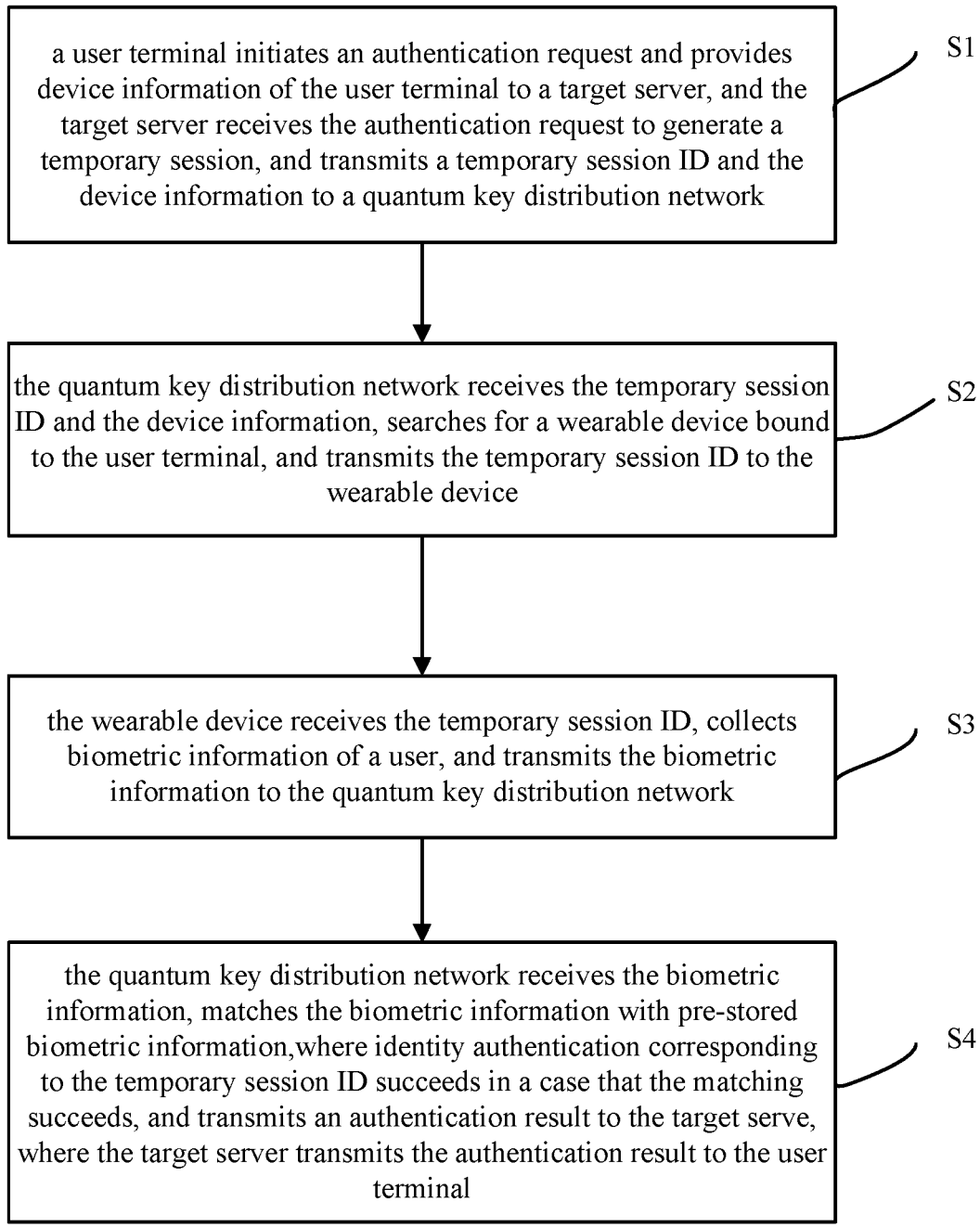
FIG. 1 is a flowchart of an identity authentication method based on a wearable device according to an embodiment of the present disclosure.

An identity authentication method based on a wearable device is provided according to this embodiment. The identity authentication method adopts biometric information identification technology. As shown in FIG. 1, the identity authentication method includes the following steps S1 to S4.

In step S1, a user terminal initiates an authentication request and provides device information of the user terminal to a target server. The target server receives the authentication request to generate a temporary session, and transmits a temporary session ID and the device information to a quantum key distribution network.

In step S2, the quantum key distribution network receives the temporary session ID and the device information, searches for a wearable device bound to the user terminal, and transmits the temporary session ID to the wearable device.

In step S3, the wearable device receives the temporary session ID, collects biometric information of a user, and transmits the biometric information to the quantum key distribution network.

In step S4, the quantum key distribution network receives the biometric information, and matches the biometric information with pre-stored biometric information. Identity authentication corresponding to the temporary session ID succeeds in a case that the matching succeeds. The quantum key distribution network transmits an authentication result to the target server. The target server transmits the authentication result to the user terminal.

The target server may be capable of both identity authentication and providing service access to the user terminal. Alternatively, the target server may be capable of identity authentication only, and in a case that identity authentication for the target server is successful, other servers provide service access to the user terminal.

The quantum key distribution network provides an interface for the target server, communicates with the target server, and distributes a first shared key to itself and the target server. The first shared key is used for encrypting and decrypting communication data between the quantum key distribution network and the target server. Optionally, the quantum key distribution network may share a key with the target server in other forms. For example, the quantum key distribution network first generates a quantum key, and then transmits the quantum key to the target server via other relatively reliable media (such as a VPN, a mobile storage medium), so as to share the quantum key with the target server.

The wearable device is registered in the quantum key distribution network. The quantum key distribution network distributes a second shared key to itself and the wearable device. The second shared key is used for encrypting and decrypting communication data between the quantum key distribution network and the wearable device.

The wearable device is registered in the quantum key distribution network as follows. A holder of the wearable device (which may be an individual, or a manufacturer or seller of the wearable device) first goes through relevant of registration procedures for network access at an operation organization of the quantum key distribution network. The operation organization of the quantum key distribution network is responsible for reviewing a network access application of a user. If the application is granted, unique quantum identity number in the entire network distributed by the quantum key distribution network is issued each wearable device applying for network access. The quantum identity number is stored in a permanent storage medium of the wearable device applying for network access. Information transmitted in each identity authentication is little. Therefore, even in case of applying one-time-pad, the shared key(s) pre-stored in the wearable device during registration and shared by the wearable device with the quantum key distribution network can be usable for a long period of time. In a case that higher security is desired, the shared key stored in the wearable device may be periodically changed. One method for changing the shared key stored in the wearable device is that the quantum key distribution network generates a new shared key, encrypts the new shared key with the old shared key, and issues the new shared key to the wearable device.

The wearable device is connected to the user terminal in a wireless manner or a wired manner.

Since the user terminal is very close to the wearable device when performing this process, the user terminal and the wearable device may be bound and transmit information to each other via Bluetooth. Under a more stringent security environment, the user terminal and the wearable device may transmit information to each other in a wired manner.

In order to avoid a replay attack, two devices (for example, the quantum key distribution network and the wearable device, as well as the quantum key distribution network and the target server) that use a quantum key for confidential communication both carry a random code during information transmission. The random code is taken from the quantum key shared with a peer device and used only once. Only when random codes on both sides are identical, this communication is legal and valid.

Optionally, the wearable device may be registered in the quantum key distribution network, to obtain a quantum identity number of the wearable device. In a case that the wearable device is bound to one user terminal, the quantum identity number is shared with the user terminal, and a binding relationship is stored in the quantum key distribution network. The wearable device may apply to the quantum key distribution network to terminate the binding relationship with the user terminal, or apply for a new binding relationship with another user terminal.

Optionally, the device information may be a device ID of the user terminal or a quantum identity number.

In step S1, before transmitting the temporary session ID and the device information to the quantum key distribution network, the method further includes: encrypting, by the target server, the temporary session ID and the device information by using the first shared key. The first shared key is shared by the target server with the quantum key distribution network.

In step S2, the quantum key distribution network receiving the temporary session ID and the device information includes decrypting the temporary session ID and the device information by using the first shared key.

Figure 3:
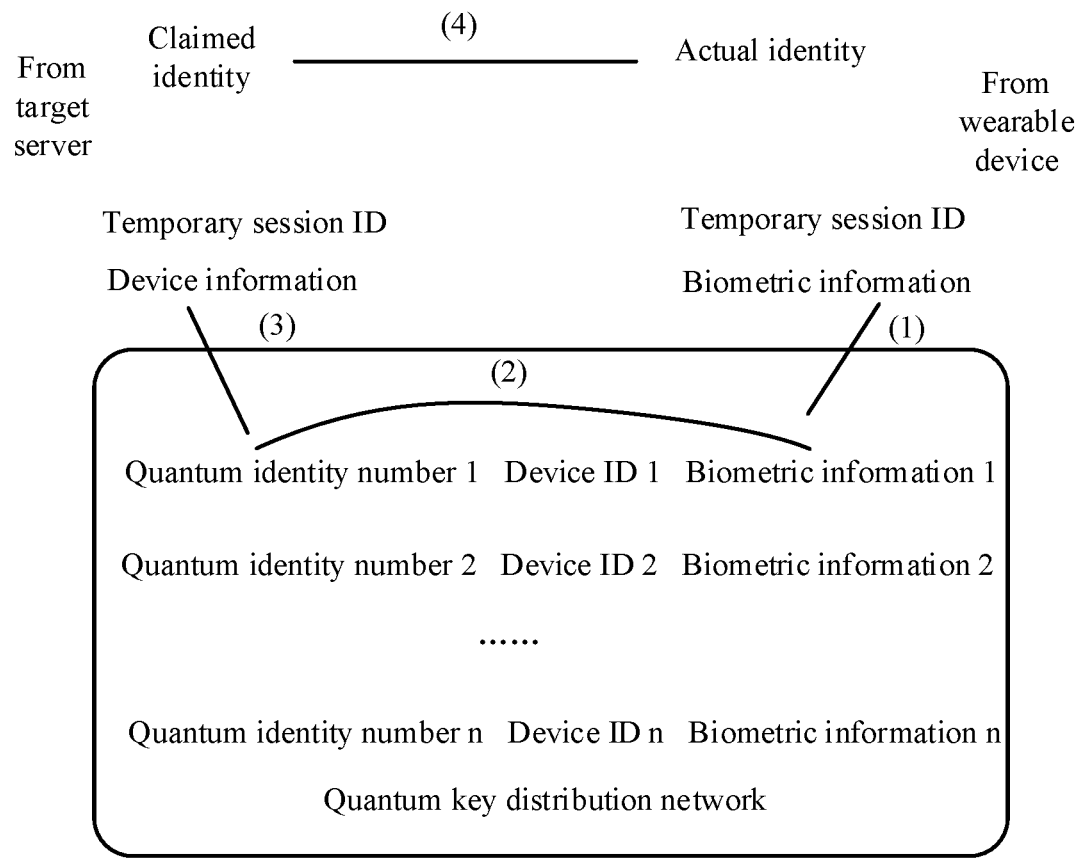
FIG. 3 is a schematic diagram showing a process that a quantum key distribution network performs identification and matching for biometric information according to a specific embodiment of the present disclosure.

In a case that the device information provided when initiating authentication is the device ID, as shown in FIG. 3, searching for the wearable device bound to the user terminal in step S2 includes: first, searching for a quantum identity number corresponding to the device ID of the user terminal in the quantum key distribution network based on the device ID of the user terminal; and then, searching for a wearable device having the quantum identity number, that is, a wearable device bound to the user terminal. Identity authentication fails in a case that no wearable device having the quantum identity number is found. Device information pre-stored in the quantum key distribution network includes at least a quantum identity number of a wearable device registered in the quantum key distribution network in advance and a device ID of a user terminal bound to the wearable device.

In a case that the device information provided when initiating authentication is the quantum identity number, searching for the wearable device bound to the user terminal in step S2 includes: searching for a wearable device having the quantum identity number, that is, a wearable device bound to the user terminal, from device information pre-stored in the quantum key distribution network. The identity authentication fails in a case that no wearable device having the quantum identity number is found. The device information pre-stored in the quantum key distribution network includes at least a quantum identity number of a wearable device registered in the quantum key distribution network.

Before transmitting the temporary session ID to the wearable device in step S2, the method further includes: encrypting the temporary session ID by using a second shared key. The second shared key is shared by the wearable device with the quantum key distribution network.

The wearable device receiving the temporary session ID in step S3 includes: decrypting the temporary session ID by using the second shared key.

The biometric information of the user in step S3 includes one or more of: fingerprint information, heartbeat information, blood pressure information, retina information, iris information, voiceprint information, vein information, facial information, handwriting signature information.

Before transmitting the biometric information to the quantum key distribution network in step S3, the method further includes: the wearable device encrypting the biometric information by using the second shared key.

The quantum key distribution network receiving the biometric information in step S4 includes: the quantum key distribution network decrypting the encrypted biometric information by using the second shared key.

The pre-stored biometric information in step S4 includes one or more of: fingerprint information, heartbeat information, blood pressure information, retina information, iris information, voiceprint information, vein information, facial information, handwriting signature information.

In step S4, the pre-stored biometric information is matched as follows. The biometric information received from the wearable device is compared with each piece of biometric information pre-stored in the quantum key distribution network. In a case that a piece of pre-stored biometric information identical to the received biometric information is found, the matching succeeds; otherwise, the matching fails, and this identity authentication also fails. Alternatively, the quantum key distribution network searches the biometric information stored in the network for the biometric information received from the wearable device. If the biometric information received from the wearable device is found, an initiator of the authentication request is a legal user already registered in the quantum key distribution network, and the matching succeeds. If the biometric information received from the wearable device is not found, the matching fails, and the identity authentication also fails.

Optionally, as shown in FIG. 3, in order to further improve security in an authentication process, the device information is further verified after the biometric information is matched during a matching process. That is, matching with the pre-stored biometric information in step S4 includes the following steps S41 to S45.

In step S41, the quantum key distribution network searches the biometric information stored in the network for the biometric information transmitted by the wearable device. In a case that the search fails, the identity authentication fails.

In step S42, in a case that the search succeeds, the quantum key distribution network further searches for device information (which is a quantum identity number or device ID, and the quantum identity number is taken as an example in FIG. 3) bound to the piece of biometric information stored in the quantum key distribution network. As shown in FIG. 3, based on the biometric information, a quantum identity number of the wearable device bound to the biometric information and device information (a quantum identity number shared with the wearable device or device ID) of the user terminal bound to the wearable device are uniquely determined.

In step S43, it is verified whether found device information is identical to the device information from the target server in step S2.

In step S44, the wearable device further transmits the temporary session ID to the quantum key distribution network concurrently with the biometric information. The quantum key distribution network verifies whether the temporary session ID from the wearable device is identical to the temporary session ID from the target server in step S2.

In step S45, in a case that the found device information is identical to the device information from the target server in step S2 and the temporary session ID from the wearable device is identical to the temporary session ID from the target server in step S2, it is indicated that a claimed identity of the initiator of the authentication request is the same as an actual identity collected on site and the claimed identity and the actual identity are in one authentication process, and therefore, the matching succeeds.

Optionally, the quantum key distribution network verifies only whether the found device information is identical to the device information from the target server in step S2, or only whether the temporary session ID from the wearable device is identical to the temporary session ID from the target server in step S2.

The quantum key distribution network pre-stores at least device information registered in the quantum key distribution network in advance, and biometric information bound to the device information.

The quantum key distribution network transmitting the authentication result to the target server and the target server transmitting the authentication result to the user terminal in step S4 include: the quantum key distribution network encrypting the authentication result by using the first shared key and transmitting the encrypted authentication result to the target server; and the target server receiving the encrypted authentication result, decrypting the encrypted authentication result by using the first shared key, and transmitting the decrypted authentication result to the user terminal.

Figure 2:
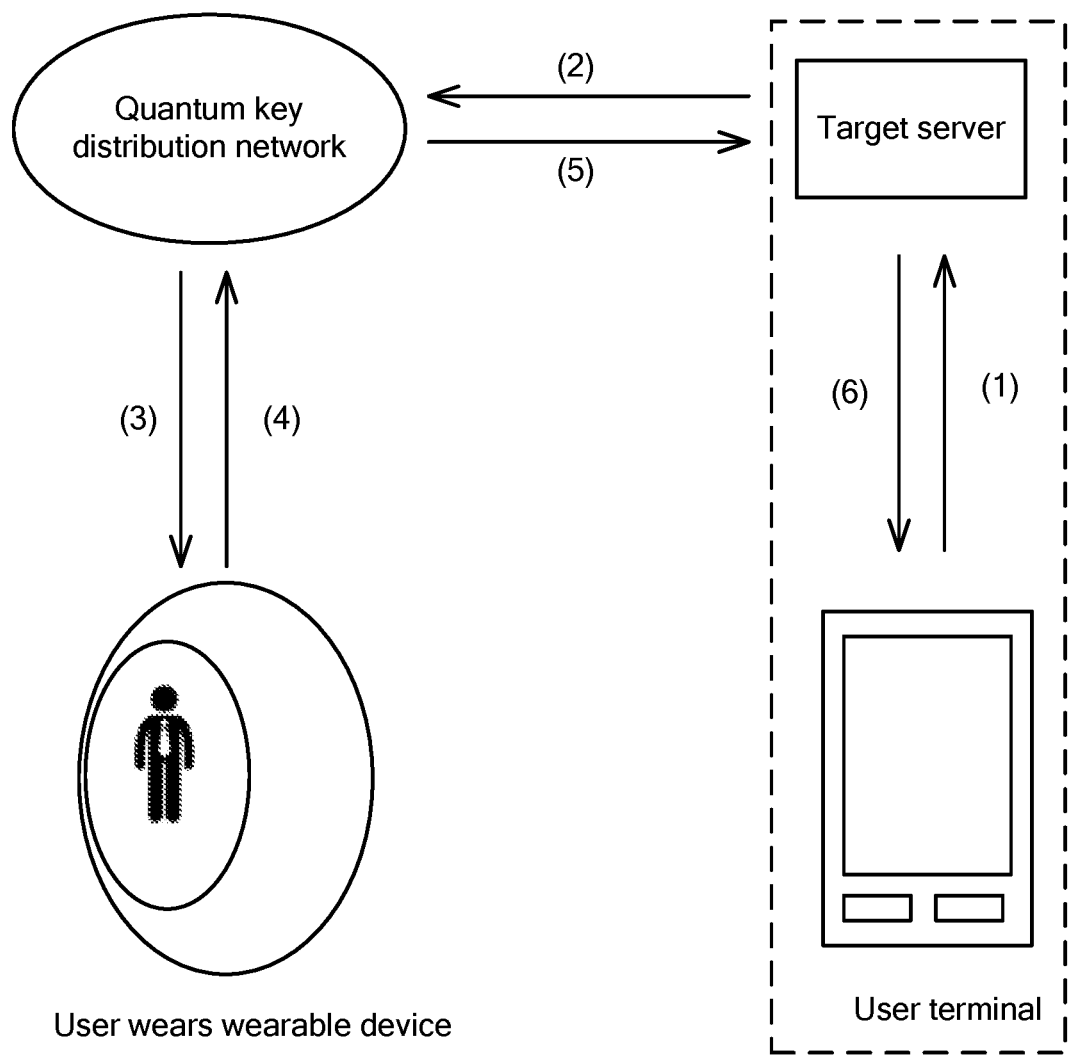
FIG. 2 is a schematic diagram showing an identity authentication process according to a specific embodiment of the present disclosure.

In order to clarify the identity authentication method based on a wearable device according to the embodiment of the present disclosure, this embodiment is described below through an example, which as shown in FIG. 2 includes the following steps (1) to (6).

In step (1), the user terminal accesses the target server and informs the server of an identity of the user terminal. The target server generates a temporary session for this login.

In step (2), the target server applies to the quantum key distribution network for authorization and authentication, encrypts information related to this temporary session and the identity of the user terminal by using a quantum key shared with the quantum key distribution network, and transmits the encrypted information related to this temporary session and the encrypted identity of the user terminal to the quantum key distribution network. The quantum key distribution network decrypts the encrypted identity after receiving them, to restore the original information.

In step (3), the quantum key distribution network internally searches for the identity of the user terminal applying for login, and transmits the information related to this temporary session to a wearable device having the identity. The information related to this temporary session is transmitted to the wearable device after being encrypted by using a shared quantum key pre-stored in both the quantum key distribution network and the wearable device. The wearable device decrypts the encrypted information after receiving it, to restore the original information.

In step (4), the wearable device collects a biometric information feature of the user, encrypts the biometric information feature by using a quantum key, and uploads the encrypted biometric information feature to the quantum key distribution network. The quantum key distribution network decrypts the encrypted biometric information feature to obtain the biometric information feature uploaded by the user.

In step (5), the quantum key distribution network compares the biometric information feature uploaded by the user with each stored biometric information feature, to determine whether authentication for the login succeeds, encrypts an authentication result by using a quantum key, and transmits the encrypted authentication result to the target server. The target server decrypts the encrypted authentication result to obtain the authentication result.

In step (6), the target server informs the user terminal of this authentication result.

The identity authentication based on a wearable device according to the embodiment of the present disclosure is particularly applicable to complex application scenarios. For example, in a case that one user terminal transmits two or more authentication requests in a short period of time (for example, applies for authorization for target server A, and then immediately applies for authorization for target server B), the quantum key distribution network may receive an authentication before a preceding authentication is completed. In this case, two different authentication processes are distinguished from each other by using temporary session IDs, so as to ensure accuracy of identity authentication.

In a simplified solution of this embodiment, the user terminal initiates an authentication request, and cannot initiate another authentication request before the previously initiated authentication request is responded (that is, before the authentication succeeds or fails). That is, within a period of time, one user device only initiates one authentication request. In this case, the temporary session ID is not required for identification, and only the device information of the user terminal is required to identify this temporary session. Specifically, the simplified solution includes the following steps S1 to S4.

In step S1, a user terminal initiates an authentication request and provides device information of the user terminal to a target server. The target server receives the authentication request to generate a temporary session, and transmits the device information to a quantum key distribution network.

In step S2, the quantum key distribution network receives the device information, searches for a wearable device bound to the user terminal, and transmits the device information to the wearable device.

In step S3, the wearable device receives the device information, collects biometric information of a user, and transmits the biometric information to the quantum key distribution network.

In step S4, the quantum key distribution network receives the biometric information, and matches the biometric information with pre-stored biometric information. This identity authentication succeeds in a case that the matching succeeds. The quantum key distribution network transmits an authentication result to the target server, and the target server transmits the authentication result to the user terminal.

Second Embodiment

Based on the identity authentication method based on a wearable device according to the first embodiment, an identity authentication system based on a wearable device is further provided according to this embodiment of the present disclosure. The identity authentication system includes a user terminal, a target server, a quantum key distribution network and a wearable device.

The user terminal is configured to initiate an authentication request and provide device information of the user terminal to a target server, and receive an authentication result transmitted by the target server.

The target server is configured to receive the authentication request to generate a temporary session, transmit a temporary session ID and the device information to the quantum key distribution network, receive the authentication result transmitted by the quantum key distribution network and transmit the authentication result to the user terminal.

The quantum key distribution network is configured to receive the temporary session ID and the device information, search for a wearable device bound to the user terminal, transmit the temporary session ID to the wearable device, receive biometric information transmitted by the wearable device, and match the biometric information with pre-stored biometric information. Identity authentication corresponding to the temporary session ID succeeds in a case that the matching succeeds, and the quantum key distribution network transmits the authentication result to the target server.

The wearable device is configured to receive the temporary session ID, collect biometric information of a user, and transmit the biometric information to the quantum key distribution network.

The target server may be capable of both identity authentication and providing service access to the user terminal. Alternatively, the target server may be capable of identity authentication only, and in a case that identity authentication for the target server is successful, other servers provide service access to the user terminal.

Optionally, the device information is a device ID of the user terminal or a quantum identity number. The quantum identity number is a unique identifier in an entire network distributed by the quantum key distribution network to the wearable device registered in the network. After the wearable device is bound to the user terminal, the quantum identity number is shared by the wearable device with the user terminal bound to the wearable device.

Optionally, one way to search for the wearable device bound to the user terminal includes the following steps of: first, searching for a quantum identity number corresponding to the device ID of the user terminal in the quantum key distribution network based on the device ID of the user terminal; and then, searching for a wearable device having the quantum identity number, that is, a wearable device bound to the user terminal. Identity authentication fails in a case that no wearable device having the quantum identity number is found. Device information pre-stored in the quantum key distribution network includes at least a quantum identity number of a wearable device registered in the quantum key distribution network in advance and a device ID of a user terminal bound to the wearable device.

Optionally, another way to search for the wearable device bound to the user terminal includes the following steps of: searching for, based on the quantum identity number from the user terminal, a wearable device having the quantum identity number, that is, a target wearable device, from device information pre-stored in the quantum key distribution network. The identity authentication fails in a case that no wearable device having the quantum identity number is found. The device information pre-stored in the quantum key distribution network includes at least a quantum identity number of a wearable device registered in the quantum key distribution network.

Optionally, the biometric information of the user includes one or more of: fingerprint information, heartbeat information, blood pressure information, retina information, iris information, voiceprint information, vein information, facial information, handwriting signature information.

The quantum key distribution network matches the biometric information with the pre-stored biometric information as follows. The biometric information received from the wearable device is compared with each piece of biometric information pre-stored in the quantum key distribution network. In a case that a piece of pre-stored biometric information identical to the received biometric information is found, the matching succeeds; otherwise, the matching fails, and this identity authentication also fails. Alternatively, the quantum key distribution network searches the biometric information stored in the network for the biometric information received from the wearable device. If the biometric information received from the wearable device is found, an initiator of the authentication request is a legal user already registered in the quantum key distribution network, and the matching succeeds. If the biometric information received from the wearable device is not found, the matching fails, and the identity authentication also fails.

Optionally, as shown in FIG. 3, in order to further improve security in an authentication process, the device information is further verified after the biometric information is matched during a matching process. That is, matching with the pre-stored biometric information includes the following steps S41 to S45.

In step S41, the quantum key distribution network searches the biometric information stored in the network for the biometric information transmitted by the wearable device. In a case that the search fails, the identity authentication fails.

In step S42, in a case that the search succeeds, the quantum key distribution network further searches for device information (which is a quantum identity number or device ID, and the quantum identity number is taken as an example in FIG. 3) bound to the piece of biometric information stored in the quantum key distribution network. As shown in FIG. 3, based on the biometric information, a quantum identity number of the wearable device bound to the biometric information and device information (a quantum identity number shared with the wearable device or device ID) of the user terminal bound to the wearable device are uniquely determined.

In step S43, it is verified whether found device information is identical to the device information from the target server.

In step S44, the wearable device further transmits the temporary session ID to the quantum key distribution network concurrently with the biometric information. The quantum key distribution network verifies whether the temporary session ID from the wearable device is identical to the temporary session ID from the target server.

In step S45, in a case that the found device information is identical to the device information from the target server and the temporary session ID from the wearable device is identical to the temporary session ID from the target server, it is indicated that a claimed identity of the initiator of the authentication request is the same as an actual identity collected on site and the claimed identity and the actual identity are in one authentication process, and therefore, the matching succeeds.

Optionally, the quantum key distribution network verifies only whether the found device information is identical to the device information from the target server, or only whether the temporary session ID from the wearable device is identical to the temporary session ID from the target server.

The quantum key distribution network pre-stores at least device information registered in the quantum key distribution network in advance, and biometric information bound to the device information.

Optionally, the devices communicate in the following manner:

the user terminal accesses the target server;

the quantum key distribution network and the target server both pre-store a first shared key for encrypting and decrypting communication data between the quantum key distribution network and the target server; and the wearable device and the quantum key distribution network both pre-store a second shared key for encrypting and decrypting communication data between the wearable device and the quantum key distribution network.

In a simplified solution of this embodiment, the user terminal initiates an authentication request, and cannot initiate another authentication request before the previously initiated authentication request is responded (that is, before the authentication succeeds or fails). That is, within a period of time, one user device only initiates one authentication request. In this case, the temporary session ID is not required for identification, and only the device information of the user terminal is required to identify this temporary session. Specifically, the identity authentication system based on a wearable device includes a user terminal, a target server, a quantum key distribution network and a wearable device.

The user terminal is configured to initiate an authentication request and provide device information of the user terminal to the target server, and receive an authentication result transmitted by the target server.

The target server is configured to receive the authentication request to generate a temporary session, transmit the device information to the quantum key distribution network, receive the authentication result transmitted by the quantum key distribution network, and transmit the authentication result to the user terminal.

The quantum key distribution network is configured to receive the device information, search for a wearable device bound to the user terminal, transmit the device information to the wearable device, receive biometric information transmitted by the wearable device, and match the biometric information with pre-stored biometric information. Identity authentication succeeds in a case that the matching succeeds, and the quantum key distribution network transmits the authentication result to the target server.

The wearable device is configured to receive the device information, collect biometric information of a user, and transmit the biometric information to the quantum key distribution network.

Third Embodiment

Based on the identity authentication method based on a wearable device according to the first embodiment, a quantum key distribution network for identity authentication is further provided according to this embodiment. The quantum key distribution network is configured to: receive device information provided by a user terminal when initiating an authentication request to a target server and a temporary session ID generated by the target server on receipt of the authentication request; search for a wearable device bound to the user terminal, and transmit the temporary session ID to the wearable device; and receive biometric information collected and transmitted by the wearable device, match the biometric information with pre-stored biometric information. Identity authentication succeeds in a case that the matching succeeds, and the quantum key distribution network transmits an authentication result to the target server.

Optionally, the device information is a device ID of the user terminal or a quantum identity number. The quantum identity number is a unique identifier in an entire network distributed by the quantum key distribution network to the wearable device registered in the network. After the wearable device is bound to the user terminal, the quantum identity number is shared by the wearable device with the user terminal bound to the wearable device.

One way to search for the wearable device bound to the user terminal includes the following steps of: first, searching for a quantum identity number corresponding to the device ID of the user terminal in the quantum key distribution network based on the device ID of the user terminal; and then, searching for a wearable device having the quantum identity number, that is, a wearable device bound to the user terminal. Identity authentication fails in a case that no wearable device having the quantum identity number is found. Device information pre-stored in the quantum key distribution network includes at least a quantum identity number of a wearable device registered in the quantum key distribution network in advance and a device ID of a user terminal bound to the wearable device.

Another way to search for the wearable device bound to the user terminal includes the following steps of: searching for, based on the quantum identity number from the user terminal, a wearable device having the quantum identity number, that is, a wearable device bound to the user terminal, from device information pre-stored in the quantum key distribution network. The identity authentication fails in a case that no wearable device having the quantum identity number is found. The device information pre-stored in the quantum key distribution network includes at least a quantum identity number of a wearable device registered in the quantum key distribution network.

After matching with the pre-stored biometric information, the quantum key distribution network is further configured to:

search for device information bound to the biometric information stored in the quantum key distribution network, and determine whether found device information is identical to the device information received from the target server; and/or determine whether a temporary session ID received from the wearable device is identical to the temporary session ID received from the target server, where the temporary session ID received from the wearable device is transmitted at the same time when the wearable device transmits the biometric information to the quantum key distribution network; and determine that the identity authentication succeeds, in a case that the found device information is identical to the device information received from the target server and/or the temporary session ID received from the wearable device is identical to the temporary session ID received from the target server, where quantum key distribution network pre-stores at least device information registered in the quantum key distribution network in advance and biometric information bound to the device information.

Optionally, the quantum key distribution network and the target server both pre-store a first shared key for encrypting and decrypting communication data between the quantum key distribution network and the target server.

Optionally, the wearable device and the quantum key distribution network both pre-store a second shared key for encrypting and decrypting communication data between the wearable device and the quantum key distribution network.

In a simplified solution of this embodiment, the user terminal initiates an authentication request, and cannot initiate another authentication request before the previously initiated authentication request is responded (that is, before the authentication succeeds or fails). That is, within a period of time, one user device only initiates one authentication request. In this case, the temporary session ID is not required for identification, and only the device information of the user terminal is required to identify this temporary session. Specifically, the quantum key distribution network for identity authentication is configured to: receive device information provided by a user terminal when initiating an authentication request to a target server; search for a wearable device bound to the user terminal, and transmit the device information to the wearable device; and receive biometric information collected and transmitted by the wearable device, and match the biometric information with pre-stored biometric information. Identity authentication succeeds in a case that the matching succeeds, and the quantum key distribution network transmits an authentication result to the target server.

Fourth Embodiment

Based on the identity authentication method based on a wearable device according to the first embodiment, a wearable device for identity authentication is further provided according to this embodiment. The wearable device is bound to a user terminal and is configured to: receive a temporary session ID transmitted by a quantum key distribution network, collect biometric information of a user, and transmit the biometric information to the quantum key distribution network for authentication. The temporary session ID is generated by a target server on receipt of an authentication request initiated by the user terminal and is transmitted by the target server to the quantum key distribution network.

The wearable device is registered in the quantum key distribution network and stores a unique quantum identity number in the entire network, and is capable of storing keys, encrypting and decrypting data, and transmitting and receiving data.

Optionally, the wearable device and the quantum key distribution network both pre-store a second shared key for encrypting and decrypting communication data between the wearable device and the quantum key distribution network.

In a simplified solution of this embodiment, the user terminal initiates an authentication request, and cannot initiate another authentication request before the previously initiated authentication request is responded (that is, before the authentication succeeds or fails). That is, within a period of time, one user device only initiates one authentication request. In this case, the temporary session ID is not required for identification, and only the device information of the user terminal is required to identify this temporary session. Specifically, the wearable device for identity authentication is bound to a user terminal and is configured to: receive device information of a user terminal transmitted by a quantum key distribution network, collect biometric information of a user, and transmit the biometric information to the quantum key distribution network for authentication. The device information is provided by the user terminal when initiating an authentication request to the target server, and is transmitted to the quantum key distribution network after the target server receives the authentication request.

Fifth Embodiment

Based on the identity authentication method based on a wearable device according to the first embodiment, a target server is further provided according to this embodiment. The target server is configured to: receive an authentication request transmitted by a user terminal and device information provided by the user terminal to generate a temporary session, and transmit a temporary session ID and the device information to a quantum key distribution network; and transmit an authentication result from the quantum key distribution network to the user terminal.

The target server is capable of both identity authentication and providing service access to the user terminal. Alternatively, the target server is capable of identity authentication only, and in a case that identity authentication for the target server succeeds, other servers provide service access to the user terminal.

Optionally, the quantum key distribution network and the target server both pre-store a first shared key for encrypting and decrypting communication data between the quantum key distribution network and the target server.

In a simplified solution of this embodiment, the user terminal initiates an authentication request, and cannot initiate another authentication request before the previously initiated authentication request is responded (that is, before the authentication succeeds or fails). That is, within a period of time, one user device only initiates one authentication request. In this case, the temporary session ID is not required for identification, and only the device information of the user terminal is required to identify this temporary session. Specifically, the target server is configured to: receive an authentication request transmitted by a user terminal and device information provided by the user terminal, and transmit the device information to a quantum key distribution network; and transmit an authentication result from the quantum key distribution network to the user terminal.

For user authentication with the identity authentication method and system based on a wearable device according to the embodiments of the present disclosure, an encryption method based on complexity of mathematical algorithms is replaced with a one-time-pad method based on symmetric quantum key(s), which improves security. A wearable device is introduced to login authentication with a target server, which enhances user experience. The quantum cryptography technology, bioidentification technology, and the wearable device are organically combined, so that reliability of identity authentication between devices as well as identity authentication between a human and a device are significantly improved. In this way, a complete and reliable authentication link from the human (user) to a remote business server is established, thereby paving the way for "last kilometer" security.

The quantum key is used in a one-time-pad manner. However, the security requirements may be lowered, so that the key no longer strictly follows the one-time-pad manner, or, based on this embodiment, the quantum key may be replaced with other keys, which should also be considered as being within the protection scope of the present disclosure.

Those skilled in the art should understand that the above modules or steps in the present disclosure may be implemented by a general-purpose computer apparatus. Optionally, the above modules or steps may be implemented by program codes executable by a computing apparatus, so that the program codes may be stored in a storage apparatus and executed by the computing apparatus. Alternatively, the above modules or steps may be implemented as individual integrated circuit modules, or multiple modules or steps among the above modules or steps may be implemented as a single integrated circuit module. The present disclosure is not limited to any specific combination of hardware and software.

Although specific embodiments of the present disclosure are described above with reference to the drawings, the protection scope of the present disclosure is not limited thereto. Those skilled in the art should understand that, based on the technical solutions of the present disclosure, various modifications or variants that are made without any creative effort are also within the protection scope of the present disclosure.

The invention claimed is:

1. A wearable-device-based identity authentication method, comprising:
    S1: initiating an authentication request and providing device information of a user terminal, by the user terminal, to a target server; and receiving, by the target server, the authentication request to generate a temporary session, and transmitting, by the target server, a temporary session ID and the device information to a quantum key distribution network;
    S2: receiving, by the quantum key distribution network, the temporary session ID and the device information, searching for, by the quantum key distribution network, a wearable device bound to the user terminal, and transmitting, by the quantum key distribution network, the temporary session ID to the wearable device;
    S3: receiving, by the wearable device, the temporary session ID, collecting, by the wearable device, biometric information of a user, and transmitting, by the wearable device, the biometric information to the quantum key distribution network;
    S4: receiving, by the quantum key distribution network, the biometric information, matching, by the quantum key distribution network, the biometric information with pre-stored biometric information, wherein identity authentication corresponding to the temporary session ID succeeds in a case that the matching succeeds, and transmitting, by the quantum key distribution network, an authentication result to the target server, wherein the target server transmits the authentication result to the user terminal.

2. The method according to claim 1, wherein the device information is a device ID of the user terminal or a quantum identity number, the quantum identity number is a unique identifier in the quantum key distribution network distributed by the quantum key distribution network to the wearable device registered in the network, and the quantum identity number is shared by the wearable device with the user terminal bound to the wearable device after the wearable device is bound to the user terminal.

3. The method according to claim 2, wherein in a case that the device information is the device ID of the user terminal, searching for the wearable device bound to the user terminal in step S2 comprises:
    first, searching for a quantum identity number corresponding to the device ID of the user terminal in the quantum key distribution network based on the device ID of the user terminal; and
    then, searching for a wearable device having the quantum identity number, the wearable device bound to the user terminal being the wearable device having the quantum identity number, wherein identity authentication fails in a case that no wearable device having the quantum identity number is found, and device information pre-stored in the quantum key distribution network comprises at least the quantum identity number of the wearable device registered in the quantum key distribution network in advance and the device ID of the user terminal bound to the wearable device registered in the quantum key distribution network in advance.

4. The method according to claim 2, wherein in a case that the device information is the quantum identity number, searching for the wearable device bound to the user terminal in step S2 comprises:
searching for, based on the quantum identity number from the user terminal, a wearable device having the quantum identity number, from device information pre-stored in the quantum key distribution network, the wearable device bound to the user terminal being the wearable device having the quantum identity number, wherein identity authentication fails in a case that no wearable device having the quantum identity number is found, and the device information pre-stored in the quantum key distribution network comprises at least the quantum identity number of the wearable device registered in the quantum key distribution network.

5. The method according to claim 1, wherein after matching with the pre-stored biometric information succeeds in step S4, the identity authentication method further comprises:
searching for device information bound to the biometric information stored in the quantum key distribution network, and determining whether found device information is identical to the device information received from the target server, wherein information pre-stored in the quantum key distribution network comprises at least device information registered in the quantum key distribution network in advance and biometric information bound to the device information; and/or
determining whether a temporary session ID received from the wearable device is identical to the temporary session ID received from the target server, wherein the temporary session ID received from the wearable device is transmitted at the same time when the wearable device transmits the biometric information to the quantum key distribution network; and
determining that the identity authentication succeeds, in a case that the found device information is identical to the device information received from the target server and/or the temporary session ID received from the wearable device is identical to the temporary session ID received from the target server.

6. The method according to claim 1, wherein the biometric information of the user comprises one or more of: fingerprint information, heartbeat information, blood pressure information, retina information, iris information, voiceprint information, vein information, facial information, handwriting signature information.

7. The method according to claim 1, wherein the quantum key distribution network and the target server both pre-store a first shared key, and the first shared key is used to encrypt and decrypt communication data between the quantum key distribution network and the target server.

8. The method according to claim 1, wherein the wearable device and the quantum key distribution network both pre-store a second shared key, and the second shared key is used to encrypt and decrypt communication data between the wearable device and the quantum key distribution network.

9. A wearable-device-based identity authentication system, comprising a user terminal, a target server, a quantum key distribution network and a wearable device,
wherein the user terminal is configured to initiate an authentication request and provide device information of the user terminal to a target server, and receive an authentication result transmitted by the target server;
the target server is configured to receive the authentication request to generate a temporary session, transmit a temporary session ID and the device information to the quantum key distribution network, receive the authentication result transmitted by the quantum key distribution network, and transmit the authentication result to the user terminal;
the quantum key distribution network is configured to receive the temporary session ID and the device information, search for the wearable device bound to the user terminal, transmit the temporary session ID to the wearable device, receive biometric information transmitted by the wearable device, and match the biometric information with pre-stored biometric information, wherein identity authentication corresponding to the temporary session ID succeeds in a case that the matching succeeds, and the quantum key distribution network transmits the authentication result to the target server; and
the wearable device is configured to receive the temporary session ID, collect biometric information of a user, and transmit the biometric information to the quantum key distribution network.

10. The system according to claim 9, wherein the device information is a device ID of the user terminal or a quantum identity number, the quantum identity number is a unique identifier in the quantum key distribution network distributed by the quantum key distribution network to the wearable device registered in the network, and the quantum identity number is shared by the wearable device with the user terminal bound to the wearable device after the wearable device is bound to the user terminal.

11. The system according to claim 10, wherein in a case that the device information is the device ID of the user terminal, searching for the wearable device bound to the user terminal comprises:
first, searching for a quantum identity number corresponding to the device ID of the user terminal in the quantum key distribution network based on the device ID of the user terminal; and
then, searching for a wearable device having the quantum identity number, the wearable device bound to the user terminal being the wearable device having the quantum identity number, wherein identity authentication fails in a case that no wearable device having the quantum identity number is found, and device information pre-stored in the quantum key distribution network comprises at least the quantum identity number of the wearable device registered in the quantum key distribution network in advance and the device ID of the user terminal bound to the wearable device registered in the quantum key distribution network in advance.

12. The system according to claim 10, wherein in a case that the device information is the quantum identity number, searching for the wearable device bound to the user terminal comprises:

searching for a wearable device having the quantum identity number, from device information pre-stored in the quantum key distribution network, the wearable device bound to the user terminal being the wearable device having the quantum identity number, wherein identity authentication fails in a case that no wearable device having the quantum identity number is found, and the device information pre-stored in the quantum key distribution network comprises at least the quantum identity number of the wearable device registered in the quantum key distribution network.

13. The system according to claim 9, wherein after the matching with the pre-stored biometric information succeeds, the quantum key distribution network is further configured to:
search for device information bound to the biometric information stored in the quantum key distribution network, and determine whether found device information is identical to the device information received from the target server, wherein information pre-stored in the quantum key distribution network comprises at least device information registered in the quantum key distribution network in advance and biometric information bound to the device information; and/or
determine whether a temporary session ID received from the wearable device is identical to the temporary session ID received from the target server; wherein the temporary session ID received from the wearable device is transmitted at the same time when the wearable device transmits the biometric information to the quantum key distribution network; and
determine that the identity authentication succeeds, in a case that the found device information is identical to the device information received from the target server and/or the temporary session ID received from the wearable device is identical to the temporary session ID received from the target server.

14. The system according to claim 9, wherein the biometric information of the user comprises one or more of: fingerprint information, heartbeat information, blood pressure information, retina information, iris information, voiceprint information, vein information, facial information, handwriting signature information.

15. The system according to claim 9, wherein the quantum key distribution network and the target server both pre-store a first shared key, and the first shared key is used to encrypt and decrypt communication data between the quantum key distribution network and the target server.

16. The system according to claim 9, wherein the wearable device and the quantum key distribution network both pre-store a second shared key, and the second shared key is used to encrypt and decrypt communication data between the wearable device and the quantum key distribution network.

17. A wearable device for identity authentication, comprising a processor and a memory having executable instructions stored thereon, wherein when executed by the processor, the executable instructions cause the processor to:
collect biometric information of a user; and
transmit the biometric information to a quantum key distribution network for authentication,
wherein the wearable device collects the biometric information of the user after receiving a temporary session ID and/or device information;
the temporary session ID is generated by a target server on receipt of an authentication request initiated by a user terminal and is transmitted by the target server to the quantum key distribution network, wherein the wearable device is bound to the user terminal; and
the device information is providing by the user terminal when initiating the authentication request to the target server, and is transmitted to the quantum key distribution network by the target server after receiving the authentication request.

18. The wearable device for identity authentication according to claim 17, wherein the wearable device is registered in the quantum key distribution network, stores a unique quantum identity number in the quantum key distribution network, and is capable of storing keys, encrypting and decrypting data, and transmitting and receiving data.

19. The wearable device for identity authentication according to claim 17, wherein the wearable device and the quantum key distribution network both pre-store a second shared key, and the second shared key is used to encrypt and decrypt communication data between the wearable device and the quantum key distribution network.

* * * * *